(12) United States Patent
Ho et al.

(10) Patent No.: US 7,188,369 B2
(45) Date of Patent: Mar. 6, 2007

(54) SYSTEM AND METHOD HAVING AN ANTIVIRUS VIRTUAL SCANNING PROCESSOR WITH PLUG-IN FUNCTIONALITIES

(75) Inventors: Chih-Kun Ho, Taipei (TW); Chien Ping Lo, Junghe (TW)

(73) Assignee: Trend Micro, Inc. (JP)

( * ) Notice: Subject to any disclaimer, the term of this patent is extended or adjusted under 35 U.S.C. 154(b) by 934 days.

(21) Appl. No.: 10/264,653

(22) Filed: Oct. 3, 2002

(65) Prior Publication Data

US 2004/0068662 A1   Apr. 8, 2004

(51) Int. Cl.
| | |
|---|---|
| G06F 11/00 | (2006.01) |
| G06F 12/14 | (2006.01) |
| G06F 12/16 | (2006.01) |
| G06F 15/18 | (2006.01) |
| G08B 23/00 | (2006.01) |

(52) U.S. Cl. ........................................ 726/24; 726/25
(58) Field of Classification Search .................. 726/22, 726/24, 25, 23, 26
See application file for complete search history.

(56) References Cited

U.S. PATENT DOCUMENTS

| | | | | |
|---|---|---|---|---|
| 5,696,822 | A * | 12/1997 | Nachenberg | 726/24 |
| 5,842,002 | A * | 11/1998 | Schnurer et al. | 703/21 |
| 5,999,723 | A * | 12/1999 | Nachenberg | 703/22 |
| 6,035,423 | A * | 3/2000 | Hodges et al. | 714/38 |
| 6,052,531 | A * | 4/2000 | Waldin et al. | 717/170 |
| 6,266,774 | B1 * | 7/2001 | Sampath et al. | 726/24 |
| 6,269,456 | B1 * | 7/2001 | Hodges et al. | 714/38 |
| 6,851,057 | B1 * | 2/2005 | Nachenberg | 726/24 |
| 6,971,019 | B1 * | 11/2005 | Nachenberg | 713/188 |
| 7,000,247 | B2 * | 2/2006 | Banzhof | 726/2 |
| 2002/0087961 | A1 * | 7/2002 | Dorricott | 717/168 |
| 2002/0091940 | A1 * | 7/2002 | Welborn et al. | 713/201 |
| 2002/0162015 | A1 * | 10/2002 | Tang | 713/200 |
| 2003/0159060 | A1 * | 8/2003 | Gales et al. | 713/200 |
| 2003/0159063 | A1 * | 8/2003 | Apfelbaum et al. | 713/200 |
| 2003/0188194 | A1 * | 10/2003 | Currie et al. | 713/201 |
| 2003/0212779 | A1 * | 11/2003 | Boyter et al. | 709/223 |
| 2004/0186971 | A1 * | 9/2004 | Meharchand et al. | 711/163 |

* cited by examiner

*Primary Examiner*—Norman M. Wright
(74) *Attorney, Agent, or Firm*—Beyer Weaver LLP

(57) ABSTRACT

The invention generally provides an antivirus network system and method having a virtual scanning processor with plug-in functionalities. A preferred embodiment of the system according to the invention primarily comprises an antivirus scanning module operable with an operating system (OS), an antivirus database comprising a plurality of computer virus signatures, a library of external antivirus instructions wherein an antivirus system external to the network system is operable to update the external instructions, a virtual scanning processor further comprising a processor emulator operable to execute a plurality of internal antivirus instructions in detecting computer viruses based on the virus signatures, and a plug-in module connected to the processor emulator and the library and receiving the external instructions from the library, wherein the processor emulator is operable to execute the external instructions. The virtual scanning processor according to the invention is advantageously hardware-independent, i.e., is operable transparently to the hardware of a computer or network system. Moreover, the virtual scanning processor according to the invention is advantageously cross-platform, i.e., is operable transparently to, and regardless of the type of, the operating system (OS) it is operating in conjunction with.

20 Claims, 5 Drawing Sheets

SYSTEM AND METHOD HAVING AN ANTIVIRUS VIRTUAL SCANNING PROCESSOR WITH PLUG-IN FUNCTIONALITIES

BACKGROUND OF THE INVENTION

1. Field of the Invention

The invention claimed in the present patent application generally relates to an antivirus system and method in a network and, more particularly, to an antivirus virtual scanning processor with plug-in functionalities and methods therefor.

2. Description of the Related Art

The Internet is an ideal mass medium for the spread of computer viruses since virtually every computer needs to be connected to another computer or network either directly or indirectly. The Internet, with all its benefits and fascinations, is nonetheless an effective and efficient medium for an intentional spread of malicious code attack. It has been estimated that some fast-paced viruses can spread throughout the entire Internet within a matter of a couple of hours if not effectively stopped. For any network environment, be it the Internet, a metropolitan area network (MAN), a wide area network (WAN), a local area network (LAN) or even wireless communications networks for mobile phones and personal digital assistant (PDA) devices, the more data transmitted and the more services offered, the more likely viruses are able to infect those networks.

In countering the increasing variety of computer viruses, antivirus scanning modules need to be continuously updated or replaced. In adding new antivirus functions, an upgrade or replacement of revised version of code is generally required in the antivirus scanning module itself. Such replacement or upgrade involves burdensome and time-consuming efforts, where new scanning module proofing is tedious. Moreover, redeployment of new scanning module will result in service interruption since it generally requires restart of antivirus service. Scanning module updates for different hardware of computer or network systems requires individual and separate implementation, e.g., over a multitude of microprocessors such as MIPS or Intel™ x86 processors.

There is thus a general need in the art for an optimal antivirus system and method that overcome at least the aforementioned shortcomings in the art. In particular, a need exists in the art for an optimal antivirus system and method having an antivirus virtual scanning processor with plug-in functionalities.

SUMMARY OF THE INVENTION

The invention generally provides an antivirus network system and method having a virtual scanning processor with plug-in functionalities. A preferred embodiment of the system according to the invention primarily comprises an antivirus scanning module operable with an operating system (OS), an antivirus database comprising a plurality of computer virus signatures, a library of external antivirus instructions wherein an antivirus system external to the network system is operable to update the external instructions, a virtual scanning processor further comprising a processor emulator operable to execute a plurality of internal antivirus instructions in detecting computer viruses based on the virus signatures, and a plug-in module connected to the processor emulator and the library and receiving the external instructions from the library, wherein the processor emulator is operable to execute the external instructions.

A preferred embodiment of the antivirus method for a computer or network system according to the invention primarily comprises the steps of operating an antivirus scanning module with an operating system (OS), storing a plurality of computer virus signatures in an antivirus database, storing a plurality of external antivirus instructions in a library, updating the plurality of external instructions with an antivirus system external to the network system, executing a plurality of internal antivirus instructions in a processor emulator in a virtual scanning processor within the antivirus scanning module by detecting computer viruses in the network system based on the plurality of virus signatures, receiving the plurality of external instructions from the library in a plug-in module connected to the processor emulator, and executing the plurality of external instructions in the processor emulator.

The antivirus virtual scanning processor advantageously allows quick and efficiently dispatched patches in performing and delivering antivirus functionalities for newly discovered computer viruses, without the need for prolonged time period in waiting for an upgrade version release for the antivirus scanning module. The virtual scanning processor according to the invention is advantageously hardware-independent, i.e., is operable transparently to the hardware of a computer or network system. Moreover, the virtual scanning processor according to the invention is advantageously cross-platform, i.e., is operable transparently to, and regardless of the type of, the operating system (OS) it is operating in conjunction with.

BRIEF DESCRIPTION OF THE DRAWINGS

The foregoing features and advantages of the invention will become more apparent in the following Detailed Description when read in conjunction with the accompanying drawings (not necessarily drawn to scale), in which.

DETAILED DESCRIPTION OF PREFERRED EMBODIMENTS

Figure 1:
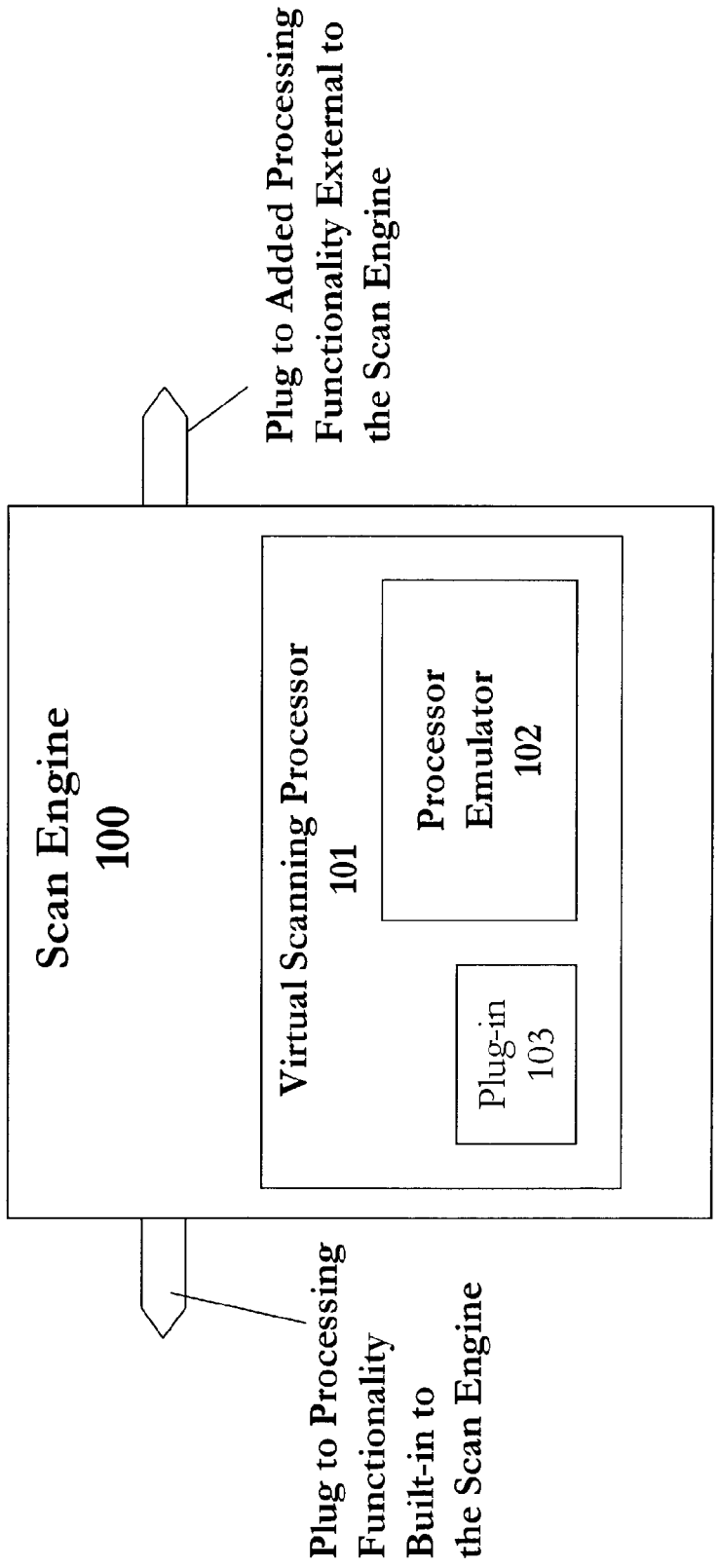
FIG. 1 is a block diagram generally illustrating an antivirus scanning module according to a general embodiment of the invention.

FIG. 1 is a block diagram that generally illustrates an antivirus scanning module 100 according to a general embodiment of the invention. An antivirus scanning module 100 according to the invention comprises a virtual scanning processor 101, which further comprises a processor emulator 102 and plug-in module 103. The scanning module 100 can plug into antivirus functionalities built-in therein, or added antivirus functionalities external to the scanning module 100. The scanning module 100 is a program that does the actual work of scanning files in a computer or network system and detecting computer viruses therein, if any. As new computer viruses appear over the Internet or other media, and existing ones evolve into new virus strains, it is necessary to add new antivirus functionalities to the scanning module 100. The scanning module 100 needs to be able to act on the new instructions in the virus pattern to successfully identify and clean the computer viruses.

The antivirus virtual scanning processor 101 advantageously allows quick and efficiently dispatched patches in performing and delivering antivirus functionalities for newly discovered computer viruses, without the need for prolonged time period in waiting for an upgrade version release for the antivirus scanning module 100. The scanning module 100 needs to be updated on a periodic basis because new types of computer viruses that may not be detected by existing scanning modules have developed, or improvements and enhancements on scanning performance and detection rates have been developed (e.g., scanning for malicious Java or ActiveX™ code), or support for virus detection or additional formats (e.g., Microsoft™ Word™ or Excel™) have been added. The virtual scanning processor 101 is generally operable with the antivirus functionality of source language syntax analyzer, which is advantageously self-modifying with replacement or update versions of antivirus functionalities. The antivirus upgrades are advantageously implemented in real time. The invention advantageously allows optimal functional flexibility, where new antivirus scanning functionalities can be added as the need arises, or existing scanning functions are self-updated on-the-fly. In addition to basic analytic and algorithmic functions, new scanning functions developed for analyzing new syntax or new language can be subsequently added on site via remotely retrieved update instructions or functions.

A preferred embodiment of the antivirus method for a computer or network system according to the invention primarily comprises the steps of operating an antivirus scanning module with an operating system (OS), storing a plurality of computer virus signatures in an antivirus database, storing a plurality of external antivirus instructions in a library, updating the plurality of external instructions with an antivirus system external to the network system, executing a plurality of internal antivirus instructions in a processor emulator in a virtual scanning processor within the antivirus scanning module by detecting computer viruses in the network system based on the plurality of virus signatures, receiving the plurality of external instructions from the library in a plug-in module connected to the processor emulator, and executing the plurality of external instructions in the processor emulator.

The method according to the invention can further comprise the step of storing computer virus pattern files in the antivirus database. Moreover, the method according to a further embodiment of the invention can include the step of providing an e-mail notification to the virtual scanning processor if there is an upgrade for the plurality of external instructions. The method according to the invention can also comprise the step of providing an automatic or incremental download to the virtual scanning processor if there is an upgrade for the plurality of external instructions. In addition, the method according to the invention can further include the step of providing browser access to the external antivirus system for the virtual scanning processor. The method according to the invention can also include the step of providing Uniform Resource Locator (URL) access for upgrading the plurality of external instructions or computer virus pattern files.

The virtual scanning processor 101 according to the invention is advantageously hardware-independent, i.e., is operable transparently to the hardware of a computer or network system. Moreover, the virtual scanning processor 101 is advantageously cross-platform, i.e., is operable transparently to, and regardless of the type of, the operating system (OS) it is operating in conjunction with.

Figure 2:
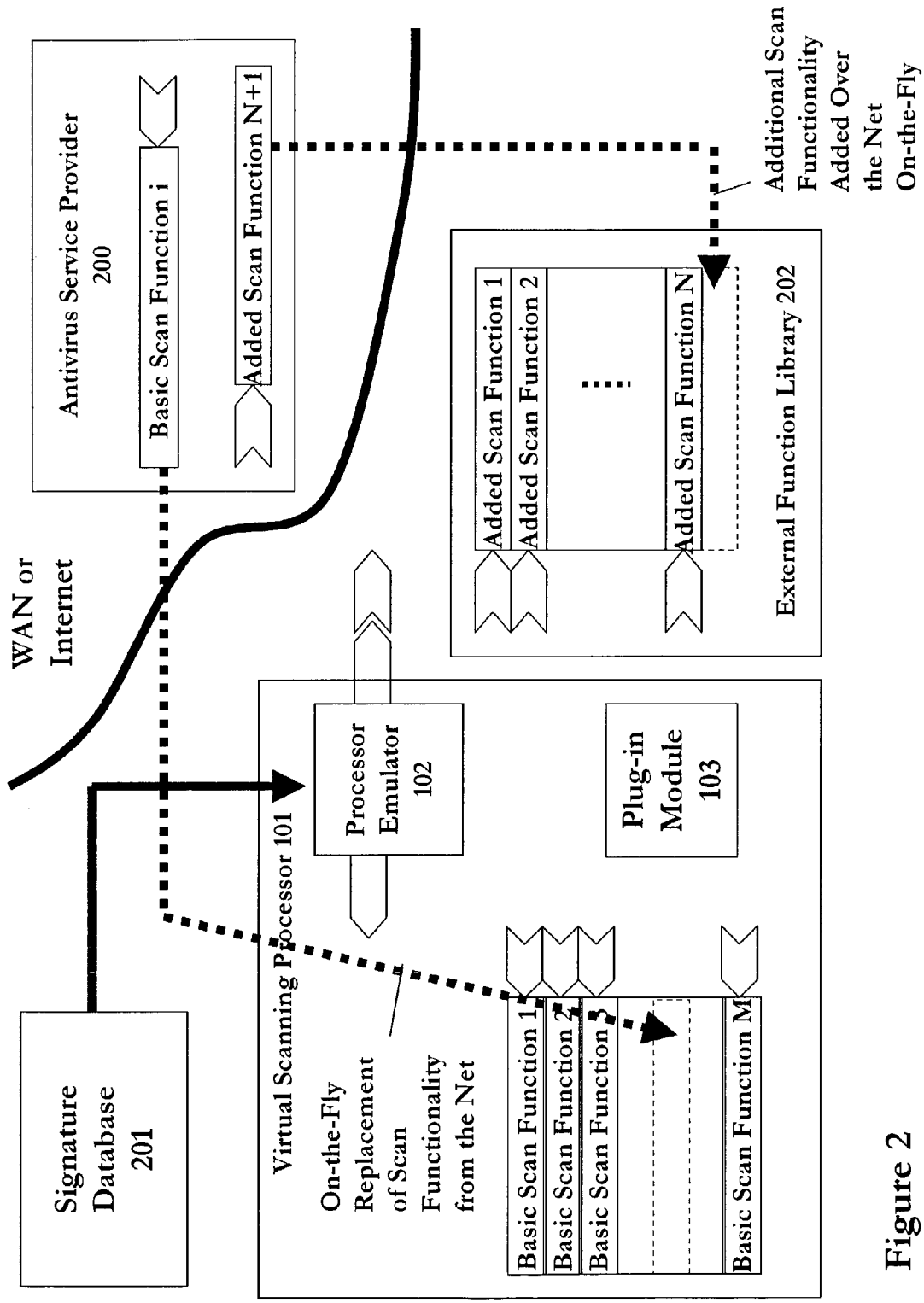
FIG. 2 is a block diagram generally illustrating a system having an antivirus virtual scanning processor with plug-in functionalities according to a preferred embodiment of the invention.

FIG. 2 is a block diagram that generally illustrates a system having an antivirus virtual scanning processor 101 with plug-in functionalities according to a preferred embodiment of the invention. The system according to this particular embodiment of the invention comprises a virtual scanning processor 101 having a plurality of internal instructions 1, 2, 3, . . . M, a computer virus signature database 201 storing a plurality of computer virus signatures, and a library 202 storing a plurality of external instructions 1, 2, 3, . . . N. The system can be connected, or further include, a plurality of workstations, client computers or device nodes (not shown). The signature database 201 can further include virus pattern files, which are data files comprising inert snippets of computer virus code used to identify viruses. External to the system is antivirus service provider 200, e.g., provided at a website (such as www.trendmicro.com) having updated internal instruction i and updated external instruction N+1. The antivirus service provider 200 is operable to update the internal instructions at the virtual scanning processor 101 and the external instructions at the library 202. An optional update feature according to the invention includes an e-mail notification service from the antivirus service provider 200 to the end user if there is an update or upgrade version available for the scanning module 100 or virtual scanning processor 101. An additional optional feature according to the invention includes Internet browser access, or Uniform Resource Locator (URL) access to specific web sites, to the antivirus service provider 200 (or automatic download therefrom) for updating or upgrading the scanning module 100 or virtual scanning processor 101 with respect to antivirus scanning functionalities or virus pattern files. A virus pattern file is a database of the binary patterns of known computer viruses. The scanning module 100 compares data files in a computer or network system with the patterns inside a virus pattern file. The virtual scanning processor 101 further comprises a processor emulator 102 and a plug-in module 103. The processor emulator 102 is operable to execute the internal instructions 1, 2, 3, . . . M in detecting computer viruses by, e.g., scanning data in the system in comparison with the plurality of virus signatures in the signature database 201. The plug-in module 103 is operable to receive the external instructions 1, 2, 3, . . . N for execution by the processor emulator 102 in performing their respective antivirus functionalities. The antivirus functionalities (internal or external instructions) can include heuristic or rule-based scan functions, encryption functions, computer virus statistics and analysis functions, virus fix and service functions, or virus trapping functions.

Once upgrades are complete in the scanning module 100 or virtual scanning processor 101, the upgrades can be further distributed to the plurality of workstations, client computers or device nodes in the system. The distributed downloads are staggered so that the client requests do not overwhelm the overall network bandwidth. A single upgrade or download is thus advantageously required without needing for additional network connections to the antivirus service provider 200 for each of the plurality of workstations, client computers or device nodes therein.

To further reduce the network bandwidth required for upgrades or updates to the virus pattern files, an incremental update according to the invention is advantageously provided. Rather than downloading the entire upgrade or virus pattern file every time is updated, only the new upgrade or new virus patterns that have been added since the last release are downloaded. The new upgrades or new patterns are then merged with the existing or previous antivirus functionalities or virus pattern file, respectively. Download and deployment time is thus advantageously reduced.

The antivirus upgrades to the scanning module 100 or updates to the virus pattern files can also be manually implemented, e.g., in the event of a computer virus outbreak. Access or connection to the antivirus service provider 200 is first secured through network access or the Internet. If a proxy server is used for Internet access, proxy server configuration needs to be first performed before downloading antivirus upgrades or virus pattern updates. Once connection to the antivirus service provider 200 is secured, the antivirus upgrades or virus pattern updates (if they are available) are accordingly downloaded. The antivirus upgrades or virus pattern updates are then deployed within the computer or network system by automatically or manually distributing them to the workstations, client computers or device nodes therein. A management console can display the upgrade or update version information currently being deployed. The antivirus service provider 200, in connection with the scanning module 100, can compare the version of the upgrades or virus pattern updates with their existing counterparts, and accordingly list new ones. In addition, a graphical display or indicator can display the download progress as the upgrades or virus pattern updates are being downloaded to the scanning module 100. The management console can further verify the successful completion of the antivirus upgrades or virus pattern updates.

Figure 3:
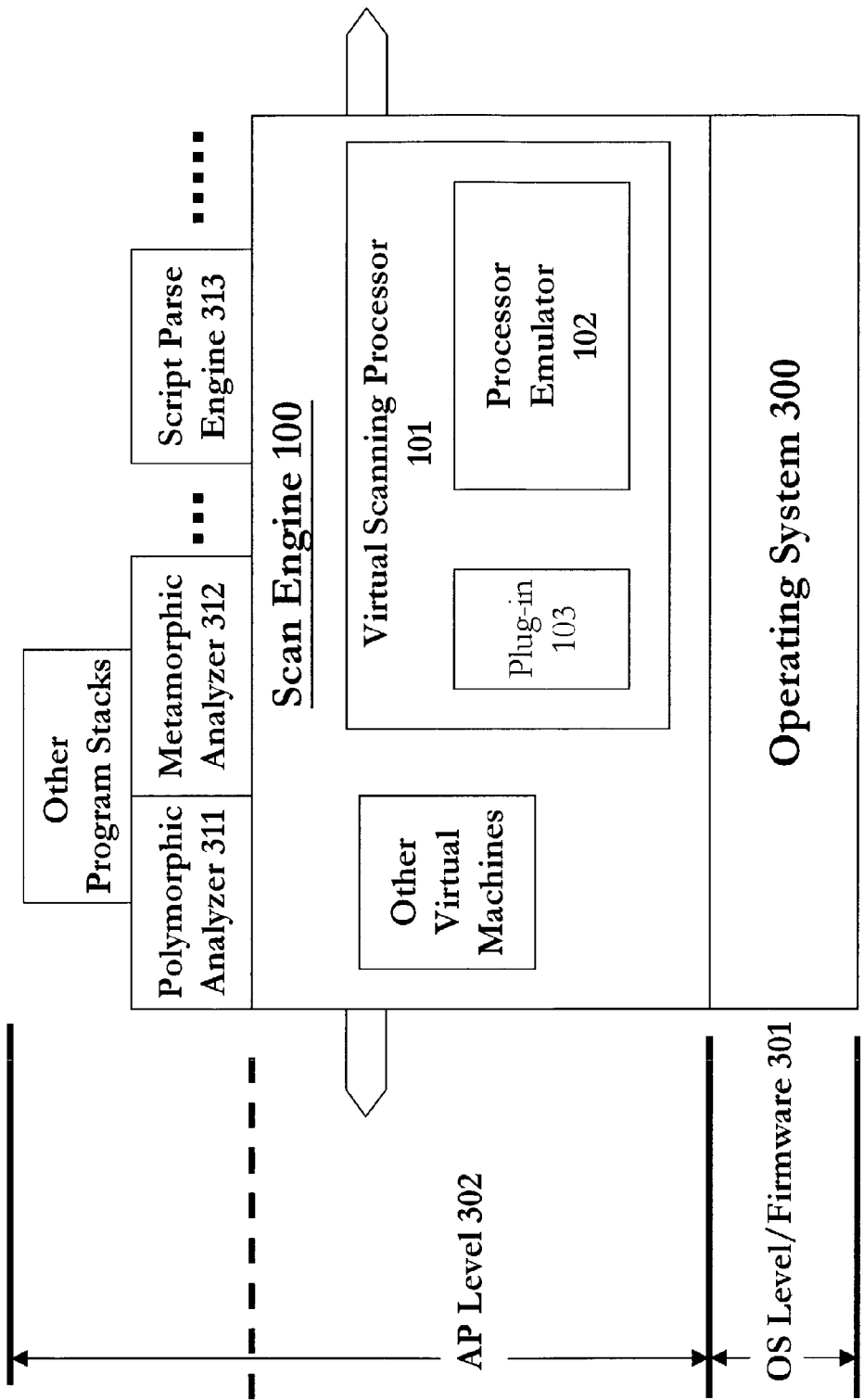
FIG. 3 is a block diagram illustrating an exemplary virtual scanning processor having plug-in functionalities in a layered structure according to another embodiment of the invention.

FIG. 3 is a block diagram that illustrates an exemplary virtual scanning processor 101 having plug-in functionalities in a layered structure according to another embodiment of the invention. The virtual scanning processor 101 according to the invention is operable with an operating system 300 (such as Windows™, Unix, Macintosh™, or Linux) at the operating system (OS) or firmware level 301. The virtual scanning processor 101 is provided at the application program (AP) level 302. The antivirus scanning module 100 according to the invention comprises the virtual scanning processor 101, which further comprises a processor emulator 102 and a plug-in module 103. Other virtual machines can also be provided at the AP level 302. Other program stacks, such as polymorphic analyzer 311, metamorphic 312 or script parse engine 313, can also be provided in performing antivirus functionalities. The antivirus functionalities can further include heuristic or rule-based scan functions, encryption functions, computer virus statistics and analysis functions, virus fix and service functions, or virus trapping functions. The processor emulator 102 is operable to execute a plurality of internal instructions built-in therein, in detecting computer viruses by, e.g., scanning data in the system in comparison with a plurality of virus signatures. The plug-in module 103 is operable to receive a plurality of external instructions for execution by the processor emulator 102 in performing their respective antivirus functionalities. The virtual scanning processor 101 is operable at the AP level 302, which generally relies on subroutines or subroutine-style codes to implement the built-in internal instructions and newly assigned external instructions. The invention advantageously allows more than one level of flexible instruction assembly, where higher-level subroutines can be flexibly assembled using existing internal instructions or external instructions. Antivirus functionalities exceeding the initially designed internal instructions in the virtual scanning processor 101 are thus readily deployable as their future flexibility is built in as an inherent feature therein. The virtual scanning processor 101 is advantageously hardware-independent, i.e., is operable transparently to the hardware of a computer or network system. Moreover, the virtual scanning processor 101 is advantageously cross-platform, i.e., is operable transparently to, and regardless of the type of, the operating system (OS) it is operating in conjunction with. Operating systems operable with the virtual scanning processor 101 include, e.g., Windows™, Windows NT™, Unix, Lotus Notes™ Microsoft™ Exchange™, OpenMail™, NetWare™ or Lotus™ cc:Mail™.

Figure 4:
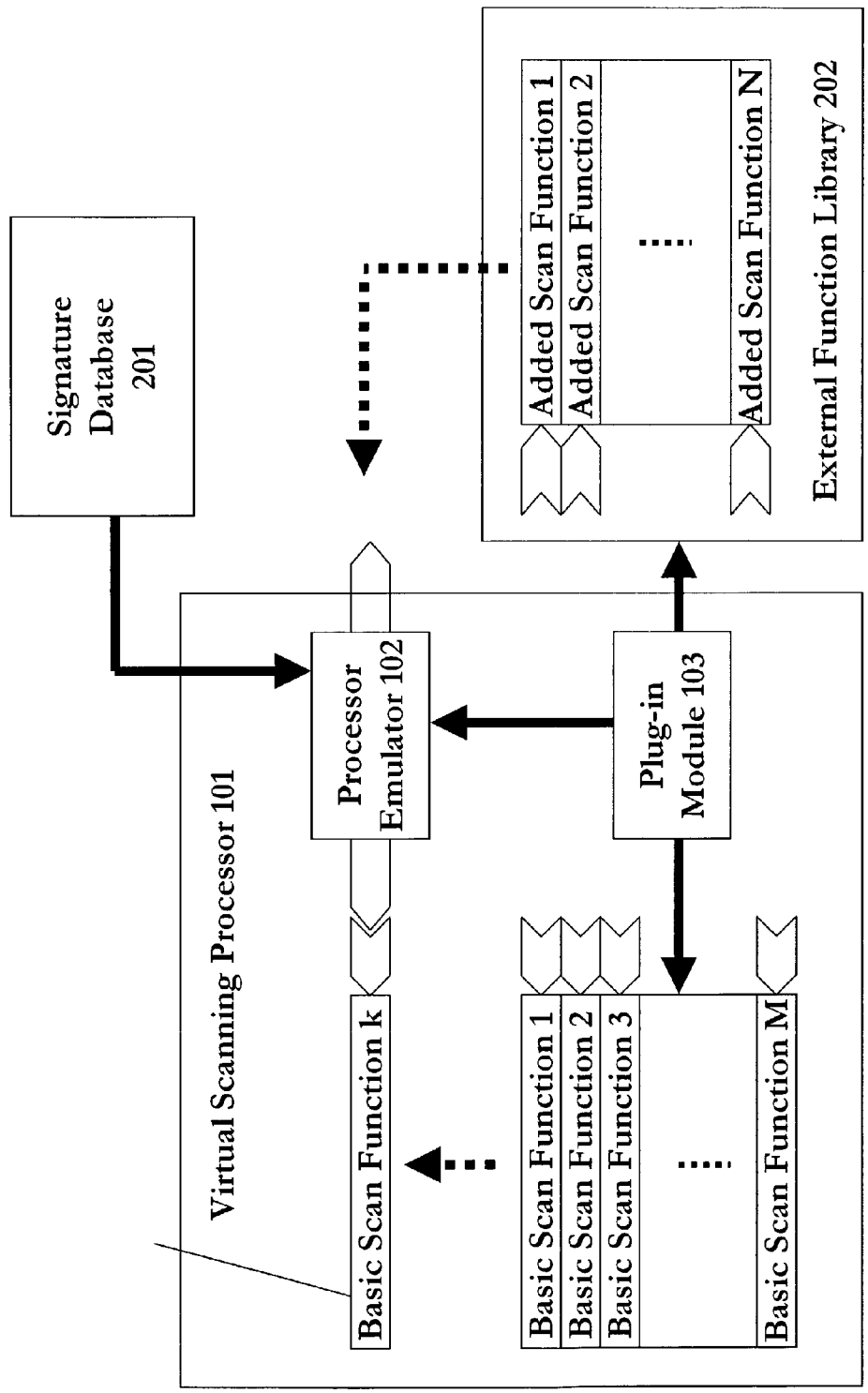
FIG. 4 is a block diagram illustrating the operation of an exemplary virtual scanning processor having plug-in functionalities when implementing a plurality of internal scan functions according to a particular embodiment of the invention.

FIG. 4 is a block diagram illustrating the operation of an exemplary virtual scanning processor having plug-in functionalities when implementing a plurality of internal scan functions according to a particular embodiment of the invention. The system according to this particular embodiment of the invention comprises a virtual scanning processor 101 having a plurality of internal instructions 1, 2, 3, . . . M, a computer virus signature database 201 storing a plurality of computer virus signatures, and a library 202 storing a plurality of external instructions 1, 2, 3, . . . N. The virtual scanning processor 101 further comprises a processor emulator 102 and a plug-in module 103. The processor emulator 102 is operable to execute the internal instructions 1, 2, 3, . . . M (internal instruction k, in particular) in detecting computer viruses by, e.g., scanning data in the system in comparison with the plurality of virus signatures in the signature database 201. The plug-in module 103 is operable to receive the external instructions 1, 2, 3, . . . N for execution by the processor emulator 102 in performing their respective antivirus functionalities.

Figure 5:
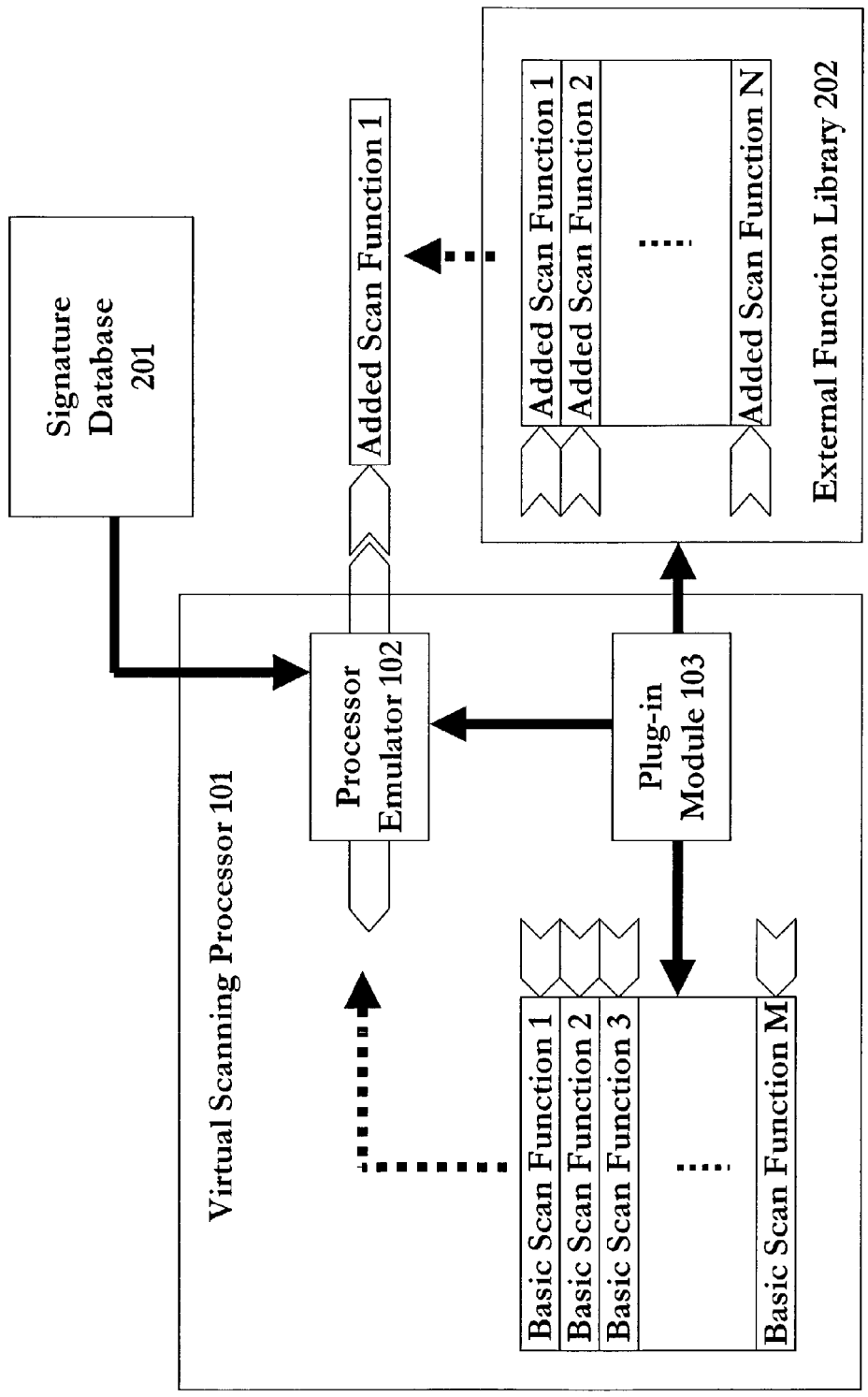
FIG. 5 is a block diagram illustrating the operation of an exemplary virtual scanning processor having plug-in functionalities when implementing a plurality of external scan functions according to an additional embodiment of the invention.

FIG. 5 is a block diagram illustrating the operation of an exemplary virtual scanning processor having plug-in functionalities when implementing a plurality of external scan functions according to an additional embodiment of the invention. The system according to this particular embodiment of the invention comprises a virtual scanning processor 101 having a plurality of internal instructions 1, 2, 3, . . . M, a computer virus signature database 201 storing a plurality of computer virus signatures, and a library 202 storing a plurality of external instructions 1, 2, 3, . . . N. The virtual scanning processor 101 further comprises a processor emulator 102 and a plug-in module 103. The processor emulator 102 is operable to execute the internal instructions 1, 2, 3, . . . M in detecting computer viruses by, e.g., scanning data in the system in comparison with the plurality of virus signatures in the signature database 201. The plug-in module 103 is operable to receive the external instructions 1, 2, 3, . . . N (external instruction 1, in particular) for execution by the processor emulator 102 in performing their respective antivirus functionalities.

The antivirus virtual scanning processor 101 advantageously allows quick and efficiently dispatched patches in performing and delivering antivirus functionalities for newly discovered computer viruses, without the need for prolonged time period in waiting for an upgrade version release for the antivirus scanning module 100. The virtual scanning processor 101 is generally operable with the antivirus functionality of source language syntax analyzer, which is advantageously self-modifying with replacement or update versions of antivirus functionalities. The invention advantageously allows optimal functional flexibility, where new antivirus scanning functionalities can be added as the need arises, or existing scanning functions are self-updated on-the-fly. In addition to basic analytic and algorithmic functions, new scanning functions developed for analyzing new syntax or new language can be subsequently added on site via remotely retrieved update instructions or functions.

It would be apparent to one skilled in the art that the invention can be embodied in various ways and implemented in many variations. For instance, a network of computers is described herein in illustrating various embodiments of the invention. The invention is accordingly applicable in this and other types of networks, such as a metropolitan area network (MAN), a wide area network (WAN), a local area network (LAN) or even wireless communications networks for mobile phones and personal digital assistant (PDA) devices. Such variations are not to be regarded as a departure from the spirit and scope of the invention. In particular, the process steps of the method according to the invention will include methods having substantially the same process steps as the method of the invention to achieve substantially the same results. Substitutions and modifications have been suggested in the foregoing Detailed Description, and others will occur to one of ordinary skill in the art. All such modifications as would be obvious to one skilled in the art are intended to be included within the scope of the following claims and their equivalents.

We claim:

1. A computer system comprising:
    an antivirus scanning engine operable with an operating system (OS);
    a virus signature database including a plurality of computer virus signatures;
    a library of external antivirus functions, said library being arranged to be updated by an antivirus service provider external to said computer system; and
    a scanning processor virtual machine including
        a plurality of internal antivirus functions for detecting computer viruses based on said virus signatures;
        a processor emulator operable to execute said internal antivirus functions and said external antivirus functions; and
        a plug-in module connected to said processor emulator and to said library, said plug-in module being arranged to receive said external antivirus functions from said library and to deliver said external functions to said processor emulator for execution.

2. The computer system of claim 1 wherein execution of said internal antivirus functions and said external antivirus functions in said scanning processor virtual machine is independent of hardware in said computer system.

3. The computer system of claim 1 wherein execution of said internal antivirus functions and said external antivirus functions in said scanning processor virtual machine is independent of said operating system (OS).

4. The computer system of claim 1 wherein said virus signature database further includes computer virus pattern files.

5. The computer system of claim 1 wherein said external antivirus service provider provides an e-mail notification to said scanning processor virtual machine if there is an upgrade for said external instructions.

6. The computer system of claim 1 wherein said external antivirus service provider provides an automatic download to said scanning processor virtual machine if there is an upgrade for said external instructions.

7. The computer system of claim 1 wherein said external antivirus service provider provides an incremental download to said scanning processor virtual machine.

8. The computer system of claim 1 further comprising:
    an Internet browser arranged to access said external antivirus service provider for upgrading said scanning processor virtual machine.

9. The computer system of claim 1 further comprising:
    a Uniform Resource Locator (URL) arranged to access said library for upgrading said external instructions.

10. The computer system of claim 1 further comprising:
    a Uniform Resource Locator (URL) arranged to access said virus signature database for upgrading said computer virus signatures.

11. An antivirus method for a computer system comprising:
    operating an antivirus scanning engine within an operating system (OS), said scanning engine including a scanning processor virtual machine;
    storing a plurality of computer virus signatures in a virus signature database;
    storing a plurality of external antivirus functions in a library;
    updating said external antivirus functions in said library with an antivirus service provider external to said computer system;
    executing a plurality of internal antivirus functions in a processor emulator in said scanning processor virtual machine for detecting computer viruses in said computer system based on said virus signatures;
    receiving said external functions from said library in a plug-in module connected to said processor emulator; and
    executing said external functions in said processor emulator.

12. The method of claim 11 wherein said internal and external functions are executed independent of said operating system (OS).

13. The method of claim 11 wherein said internal and external functions are executed independent of hardware in said computer system.

14. The method of claim 11 further comprising: storing computer virus pattern files in said virus signature database.

15. The method of claim 11 further comprising:
    providing an e-mail notification to said scanning processor virtual machine if there is an upgrade for said external instructions.

16. The method of claim 11 further comprising:
    providing an automatic download to said scanning processor virtual machine if there is an upgrade for said external instructions.

17. The method of claim 11 further comprising:
    providing an incremental download to said scanning processor virtual machine.

18. The method of claim 11 further comprising:
    providing an Internet browser arranged to access said external antivirus service provider for upgrading said scanning processor virtual machine.

19. The method of claim 11 further comprising:
    providing Uniform Resource Locator (URL) arranged to access said library for upgrading said external instructions.

20. The method of claim 11 further comprising:
    providing a Uniform Resource Locator (URL) arranged to access said virus signature database for upgrading said computer virus signatures.

* * * * *